United States Patent [19]

May et al.

[11] Patent Number: 5,782,056

[45] Date of Patent: Jul. 21, 1998

[54] PACKAGING APPARATUS FOR REMOVING A PRODUCT FROM A CONTINUOUSLY MOVING CONVEYOR AND SEALING SAID PRODUCT IN A BAG WITH A CLOSURE

[75] Inventors: Dennis J. May, Moncure, N.C.; Eddie M. Norton, McDonough, Ga.; Brian K. Digeso, Raleigh, N.C.; Kuo-Raid Grant Chen, Cary, N.C.; Christopher T. Booker, Garner, N.C.

[73] Assignee: Delaware Capital Formation, Inc., Wilmington, Del.

[21] Appl. No.: 904,893

[22] Filed: Aug. 1, 1997

Related U.S. Application Data

[63] Continuation-in-part of Ser. No. 743,994, Nov. 4, 1996, abandoned, which is a continuation of Ser. No. 481,182, Jun. 7, 1995, Pat. No. 5,570,561, which is a continuation of Ser. No. 183,484, Jan. 18, 1994, abandoned.

[51] Int. Cl.⁶ ........................................................ B65B 61/00
[52] U.S. Cl. ........................ 53/138.4; 53/138.3; 53/284.7; 53/258; 53/571; 53/572; 53/495; 53/500
[58] Field of Search ........................... 53/138.3, 138.4, 53/138.7, 138.8, 284.7, 258, 570, 571, 572, 573, 493, 495, 500, 501

[56] References Cited

U.S. PATENT DOCUMENTS

| | | |
|---|---|---|
| 2,880,419 | 4/1959 | Tipper . |
| 2,946,166 | 7/1960 | Baxter . |
| 3,145,517 | 8/1964 | Saumsiegle . |
| 3,238,698 | 3/1966 | Hollenton . |
| 3,394,528 | 7/1968 | Tipper . |
| 3,543,378 | 12/1970 | Klenz . |
| 3,717,972 | 2/1973 | Niedecker . |
| 3,942,302 | 3/1976 | Bloom . |
| 3,971,191 | 7/1976 | Hoyland . |
| 4,001,926 | 1/1977 | Verlarde . |
| 4,004,339 | 1/1977 | Verlarde . |
| 4,059,868 | 11/1977 | Meyn . |
| 4,062,169 | 12/1977 | Lister et al. . |
| 4,147,012 | 4/1979 | van Mil . |
| 4,183,194 | 1/1980 | Lucke . |
| 4,219,989 | 9/1980 | Andrews . |
| 4,352,263 | 10/1982 | Andrews . |
| 4,388,811 | 6/1983 | Zebarth . |
| 4,406,037 | 9/1983 | Hazenbroek . |
| 4,432,188 | 2/1984 | Andrews . |
| 4,457,124 | 7/1984 | Hartmann . |
| 4,468,838 | 9/1984 | Sjostrom et al. . |
| 4,610,050 | 9/1986 | Tieleman et al. . |
| 4,616,380 | 10/1986 | Tieleman . |
| 4,683,616 | 8/1987 | Tieleman . |
| 4,731,807 | 3/1988 | Tieleman . |
| 4,731,907 | 3/1988 | Tieleman . |
| 4,776,063 | 10/1988 | Tieleman . |
| 4,935,990 | 6/1990 | Linnenbank . |
| 4,951,353 | 8/1990 | Tieleman . |
| 4,958,408 | 9/1990 | Meyn . |
| 4,965,908 | 10/1990 | Meyn . |
| 4,971,845 | 11/1990 | Aaker et al. . |
| 5,080,630 | 1/1992 | Tieleman et al. . |
| 5,088,959 | 2/1992 | Heemskerk . |
| 5,092,815 | 3/1992 | Polkinghorne . |
| 5,098,333 | 3/1992 | Cobb . |
| 5,147,241 | 9/1992 | Rudin . |
| 5,194,035 | 3/1993 | Dillard . |

*Primary Examiner*—Daniel Moon
*Attorney, Agent, or Firm*—Banner & Witcoff Ltd.

[57] ABSTRACT

Apparatus for packaging includes a pivoting transport arm for removing a product from a moving conveyor and placing the product at a first work station. A pusher mechanism pushes the product delivered to the first station between spaced plates into a plastic bag and then through gates of a closure device to the second station. The closure device seals the bag with the product therein and the bagged product is subsequently discharged from the second station.

14 Claims, 15 Drawing Sheets

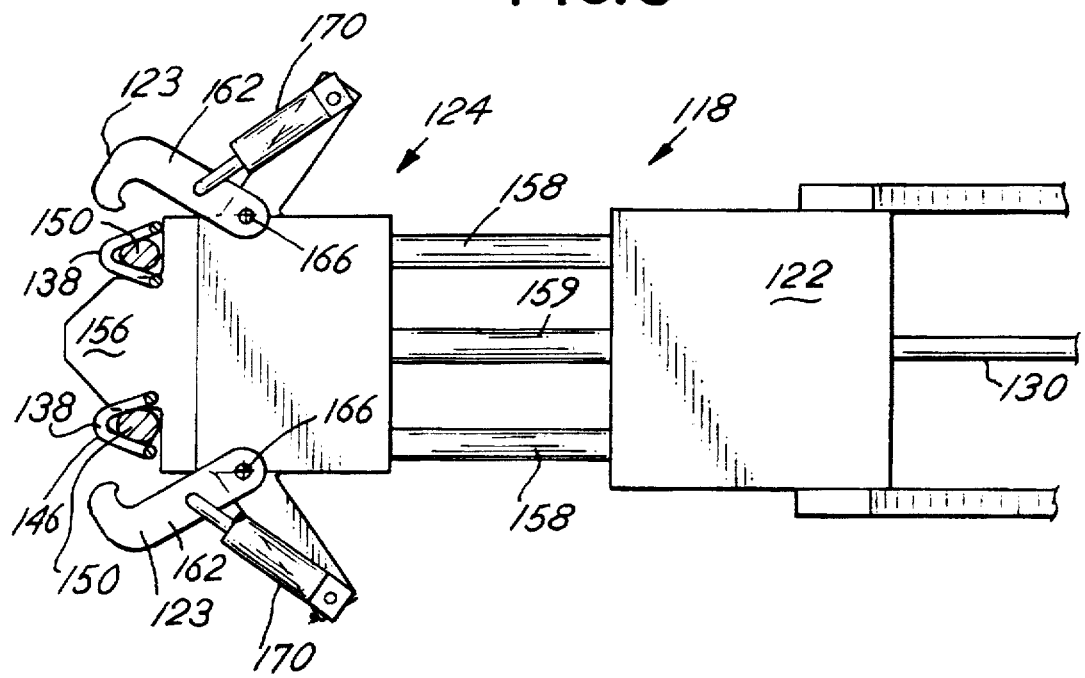
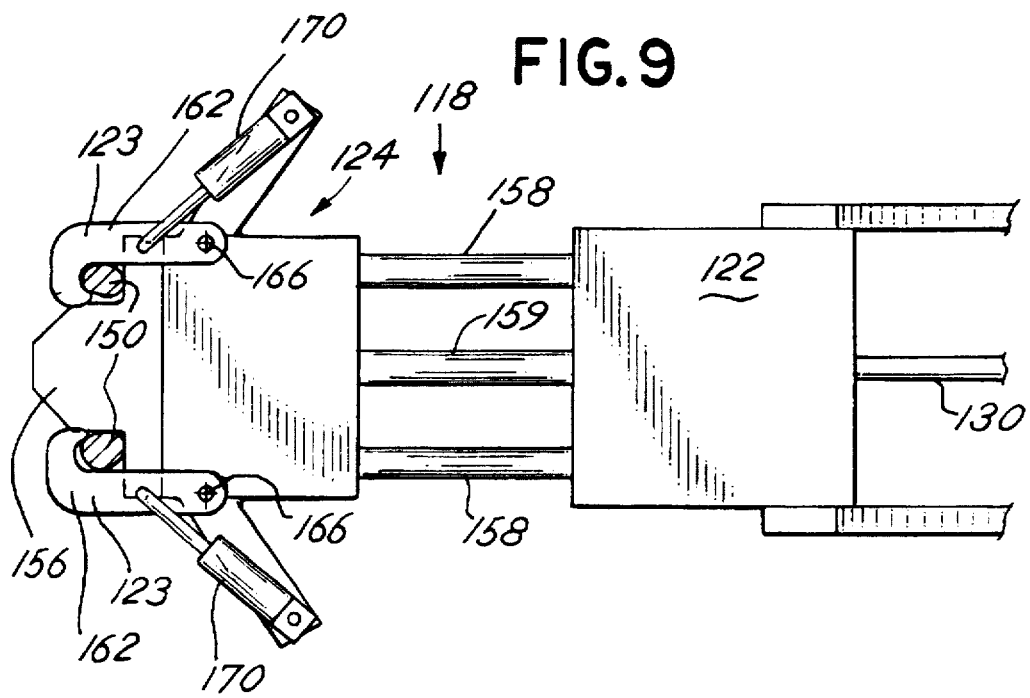

5,782,056

PACKAGING APPARATUS FOR REMOVING A PRODUCT FROM A CONTINUOUSLY MOVING CONVEYOR AND SEALING SAID PRODUCT IN A BAG WITH A CLOSURE

CROSS REFERENCE TO RELATED APPLICATIONS

This application is a continuation in part of application Ser. No. 08/743,994, filed Nov. 4, 1996 now abandoned; which is a continuation of application Ser. No. 08/481,182, filed Jun. 7, 1995, now U.S. Pat. No. 5,570,561; which is a continuation of Ser. No. 08/183,484, filed Jan. 18, 1994 now abandoned.

BACKGROUND OF THE INVENTION

This invention relates to an improved packaging device or apparatus and, more particularly, to a device for the packaging of product in flexible bags using a U-Shaped metal clip for closure of the bag.

The use of U-Shaped metal clips for closure of packaging has been taught in various prior art patents including the following: U.S. Pat. Nos. 3,394,528, 3,543,378, 2,880,419, 4,004,339, and 4,001,926. These various prior art patents disclose the placement of a product in casing or packaging material. The packaging is then closed or sealed by means of a U-Shaped metal clip formed about the casing after the casing is gathered.

Packaging in a flexible bag is generally very labor intensive and requires numerous steps. For example, placement of a product in a flexible bag followed by sealing of the bag requires a series of work stations with a single operation performed at each station wherein manipulation and reorientation of the product and bag are required during movement of the product between stations. The present invention relates to a device which provides for packaging of products in a simplified manner involving removal of product from a moving conveyor to a first work station and subsequent automatic bagging and sealing of the bagged product.

SUMMARY OF THE INVENTION

In a principal aspect, the present invention comprises apparatus for packaging of a product by transporting single units of the product from a moving conveyor to a packaging machine.

The product to be packaged is supported on a continuously moving conveyor of the type wherein a series of such products are each supported by a single support member or set of support members carried by the conveyor in a continuously moving single file line. A transport arm pivotally mounted on a frame adjacent the conveyor includes a telescoping gripping member or assembly. The gripping assembly may be telescoped to an extended position for gripping the product as it moves on the conveyor line. The product is thereby gripped by the gripping assembly and quickly withdrawn from the conveyor line as the gripping assembly retracts. The transport arm then pivots carrying the product to a first work station or bay where the product is positioned by again extending the gripping assembly to the first station. The first work station includes product clamping and orientation plates which hold the product in place as the gripping assembly releases the product.

The orientation plates typically will pivot about horizontal axes and are arranged parallel to one another on opposite sides of the pathway from the first work station to a flexible plastic bagging station. Such plates may further include slots which enable closure of the plates about a product retained in the product bay or region of the first work station. The slots permit access to the bay by the transport arm which transports the product from the moving conveyor to the first work station so that the plates may hold the product when the transport assembly positions the product in the bay.

The first work station includes a horizontal support surface defined between the spaced, product orientation plates. The plates are capable of pivotal movement toward and away from one another and, together, further define a product pathway from the first station. A flexible plastic bag is fitted over supplemental spaced guide plates at the exit end of the first station so that product pushed by a pusher mechanism will be driven into a flexible plastic bag at a flexible bag station and then further to a second station. A pusher block at the first station, which may optionally include vacuum passages, pushes the product through the flexible bag station to the second work station. Thus the pusher block is engaged with the product positioned at the first station, and as that product is pushed into a flexible container bag, gas or air is optionally withdrawn from the bag by means of a vacuum system incorporated with the pusher block. Further, the block may include special indentations adapted to facilitate guidance of the product into the bag.

The second work station includes a horizontal platform generally on the same plane as or slightly below the horizontal support plane of the first work station. The second work station platform further includes a trap door mechanism and a retention block which may move to retard and control the movement of the product and flexible bag transported from the first work station to the second work station.

Intermediate the first work station and the second work station and downstream from the flexible bag station is a clipping apparatus for gathering, closing and sealing the open end of the flexible bag that projects from the second work station. That is, the open end of the bag projects into the region of the clipping apparatus toward the first station from the second work station. The flexible bag, once positioned at the second work station, will be partially closed by a piston actuated holding bar. Gathering gates on opposite sides of the neck of the flexible bag are then closed about the flexible bag to thereby further gather the open end of the bag and to define a clip channel. Subsequently, a U-Shaped metal clip is driven in the clip channel by means of a piston actuated punch. The U-Shaped metal clip is formed about the neck of the gathered flexible bag to thereby close and seal the bag. The excess tail or outer end of the flexible bag is then cut or clipped by a piston actuated knife mounted on one of the clipper gate members. Subsequent to attachment of a clip to the neck of the flexible bag and cutting the excess tail therefrom, the gates are opened. Meanwhile, the pusher block travels to a fully retracted position at the first station while a trap door mechanism is actuated as the second station to drop the product onto a conveyor.

Substantially simultaneously, the bag holding or guide plates arranged at the first work station are actuated to receive and retain a new flexible bag. That is, a bag mounted on a storage platform adjacent the first station is opened by compressed air and is fitted over the ends of the bag holding plates. The plates are then separated to retain the bag in the pathway between the first and second sections.

The apparatus of the invention may further include control means enabling the pivoting transport arm to intermittently grip onto a product transported by the conveyor and remove said product from the conveyor, but only on those occasions when a product is sensed in position for gripping by the transport arm mechanism. Thus, for example, the conveyor may be set so that the transport arm will be actuated only when an integral number of carrier elements have passed the gripping mechanism. Moreover, the apparatus may include a further sensor which insures that the product transport arm will not be actuated unless there is product on the product carrier of the conveyor.

Thus, it is an object of the invention to provide an improved packaging apparatus.

It is a further object of the invention to provide an improved packaging apparatus especially useful for packaging of products wherein the apparatus is comprised of first and second principal work stations adapted to receive product from a continuously moving conveyor.

Another object of the invention is to provide packaging apparatus useful for the packaging of product in a flexible plastic bag wherein the bag is retained at a first work station by means of generally parallel plates or pivotal clamps spaced from one another so that the product may be pushed between the plates into the bag.

Yet another object of the invention is to provide an improved packaging apparatus wherein product is pushed from a first work station into a flexible package to a second work station and further wherein the open end of the bag projects from the second work station toward the first work station into the pathway of clipping apparatus which is operative to close and seal the bag.

Yet a further object of the invention is to provide a simplified packaging apparatus having first and second work stations wherein the apparatus operate sequentially to transfer product from the first work station to the second station in a manner which positions the product within a flexible bag during the transfer and further positions the product at the second station in a manner which permits closing and sealing of the bag.

Yet another object of the invention is to provide an improved packaging apparatus which permits the packaging of products in a manner which is commercially acceptable and attractive to consumers.

Yet a further object of the invention is to provide an improved packaging apparatus which is easy to operate and which operates at a high rate of speed to effect packaging.

Yet a further object of the invention is to provide a product packaging machine which is designed to remove a single product from a moving conveyor line and transport that product into an intermittently operating packaging machine.

Another object of the invention is to provide a product packaging apparatus or device which includes a transport arm characterized as including a mechanism which automatically grips onto selected products moving along a continuously moving conveyor line and transporting those products to a work bay or first work station for further processing.

Another object of the invention is to provide a product packaging apparatus wherein the apparatus includes a means to remove air or otherwise provide a vacuum in a flexible bag which is used to package the product.

A further object of the invention is to provide an improved packaging apparatus characterized as including a mechanism for removing single products from a continuously moving conveyor line and packaging those products in an intermittent packaging device wherein the packaging device further includes clamps or plates which orient the product at a first work station when said product is positioned therein by the mechanism utilized to remove the product from the continuously moving conveyor line.

Another object of the invention is to provide a transport arm assembly in combination with a packaging machine wherein preset units of product may be removed from the conveyor line by the arm assembly and packaged in a flexible bag.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 8 is a top plan view of a typical mechanism for engaging and gripping product from a continuously operating conveyor line;

FIG. 9 is a plan view, similar to FIG. 8, illustrating the operation of the gripping assembly or mechanism which may be utilized in the combination of the invention;

DESCRIPTION OF THE PREFERRED EMBODIMENT

General Description

Figure 1:
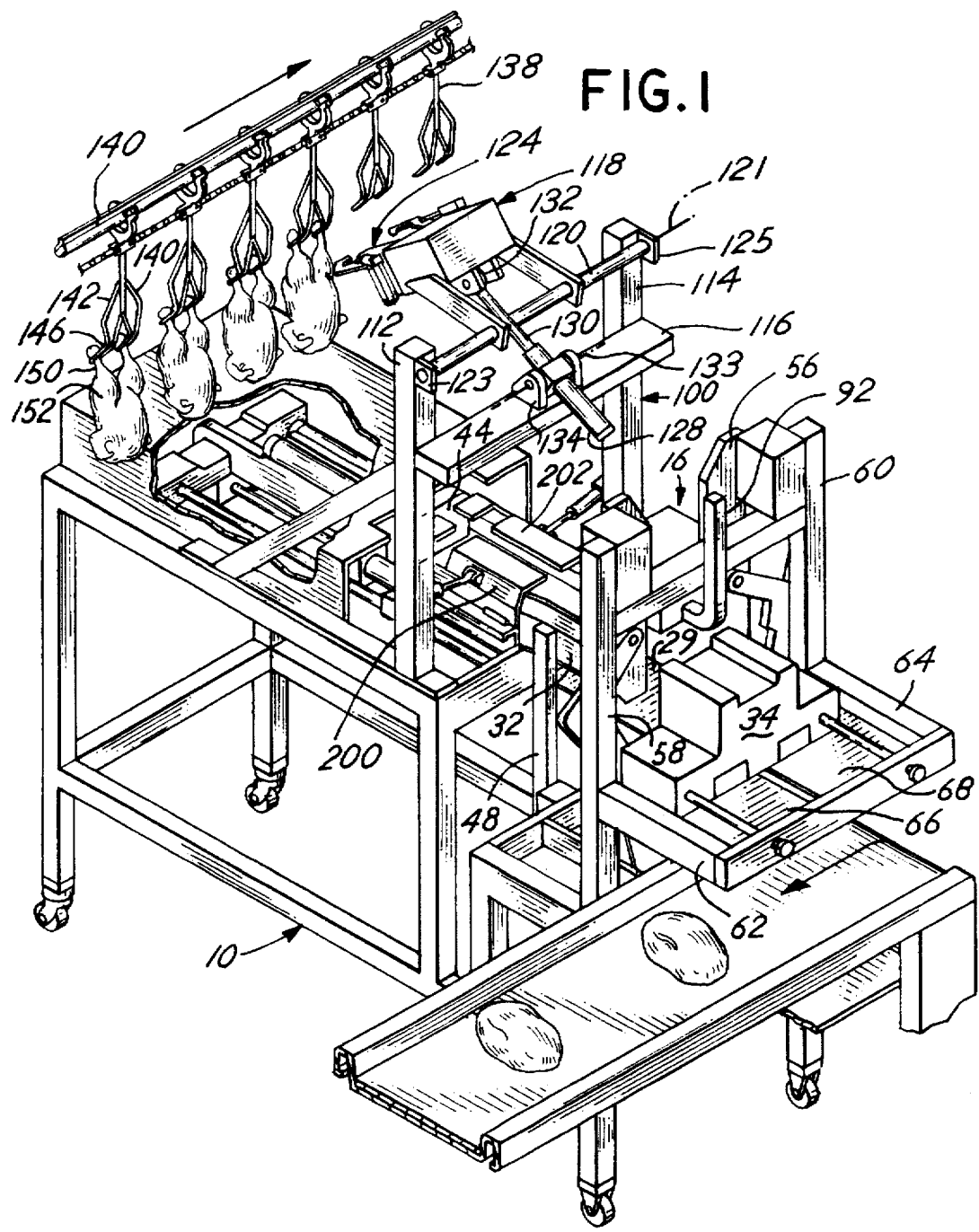
FIG. 1 is an isometric view illustrating the packaging apparatus of the invention.

FIG. 1 is an isometric view of the overall apparatus or device of the invention. FIGS. 2–9 illustrate a transport arm mechanism in a series of sequential operative steps wherein product hanging vertically from a product holder on a continuously moving conveyor is removed from the conveyor and packaged. More particularly, the top end of product is held by an open sided shackle or holder or carrier on the moving conveyor and the transport arm operates sequentially to remove, reorient and place the product at a first work station or receiving bay of a packaging device. Thereafter the product is oriented by plates or clamps in the bay, released by the transport arm and driven by a pusher block into a flexible bag. As the transport arm returns to its original position, the pusher block continues to push the product in the bag to a second station. The open end of the flexible bag is then closed and sealed by a fastening device positioned between the first and second stations as the pusher block is retracted. Packaged product is then discharged from the second station and the cycle recommenced.

Transport Arm Assembly

As a first series of steps in the packaging sequence, a transport arm assembly removes product units from a moving conveyor to a packaging device. Referring to FIGS. 2–9, there is depicted a transport arm assembly and its operation. The transport arm assembly includes a support stand 110 which includes a pair of spaced, vertical support members 112 and 114 connected by a brace or cross member 116. A transport arm 118 is pivotally mounted on a shaft 120 suspended or extending between the brackets 123, 125 attached to the support members 112 and 114 respectively. Transport arm 118, thus, is positioned to pivot about axis 121 of the shaft 120 between a first position depicted in FIG. 2 and a second position illustrated, by way of example, in FIG. 7.

Figure 2:
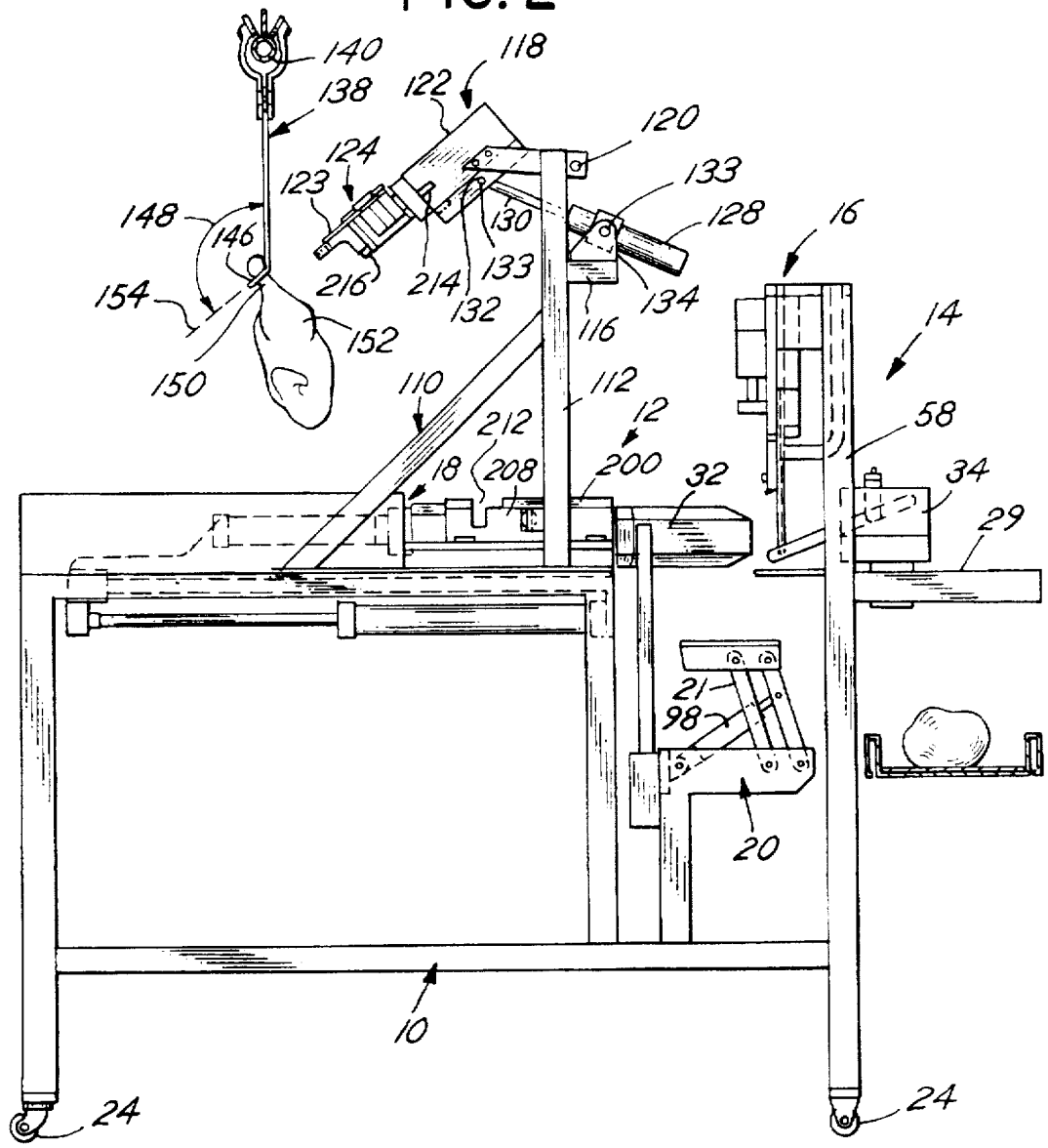
FIG. 2 is a side elevation view of the transport arm assembly utilized in combination with the multiple station packaging machine.
Figure 3:
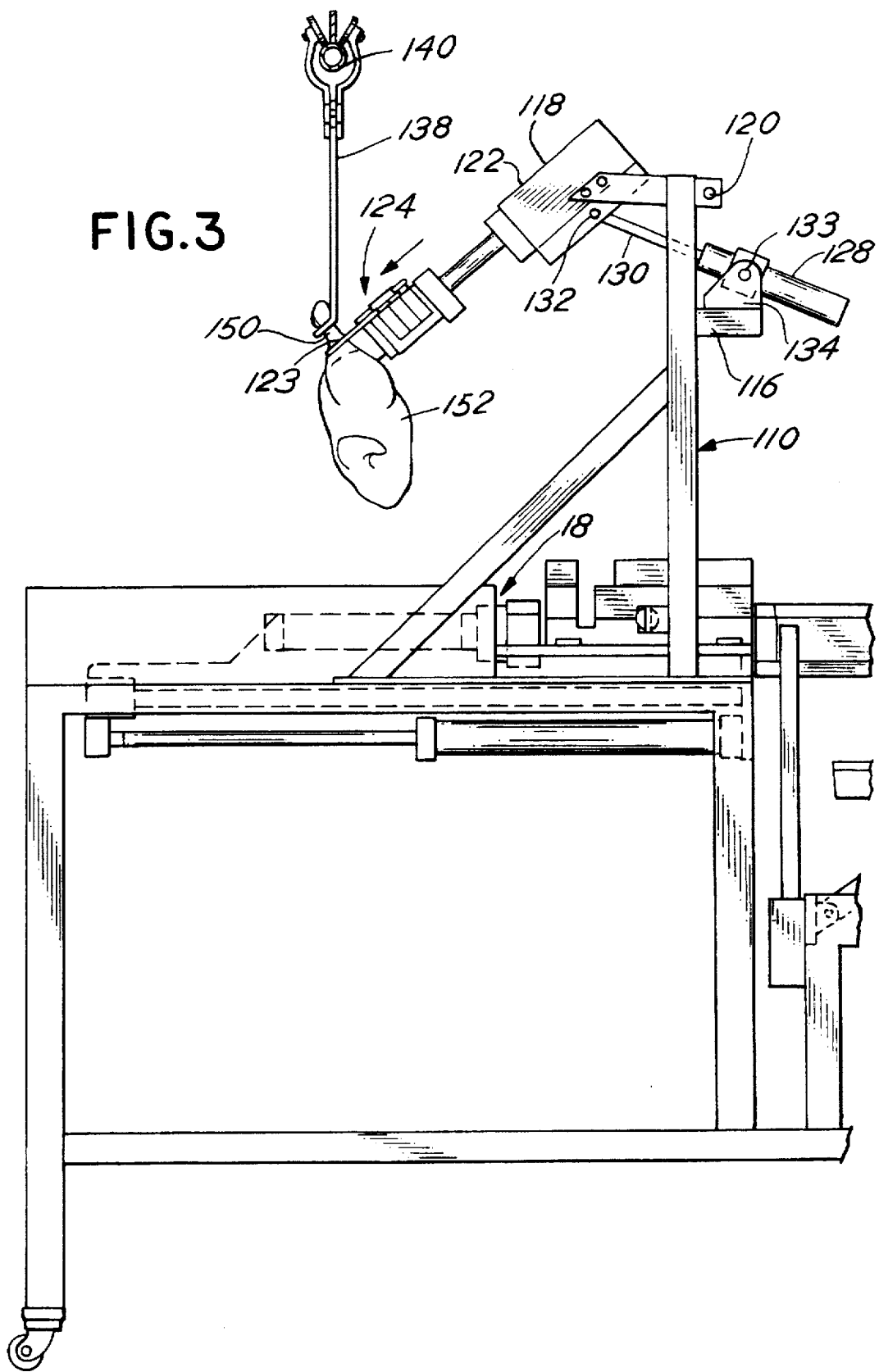
FIG. 3 is a side elevation, similar to FIG. 2, wherein the transport arm has moved to a first sequential step in the operation of the device.
Figure 4:
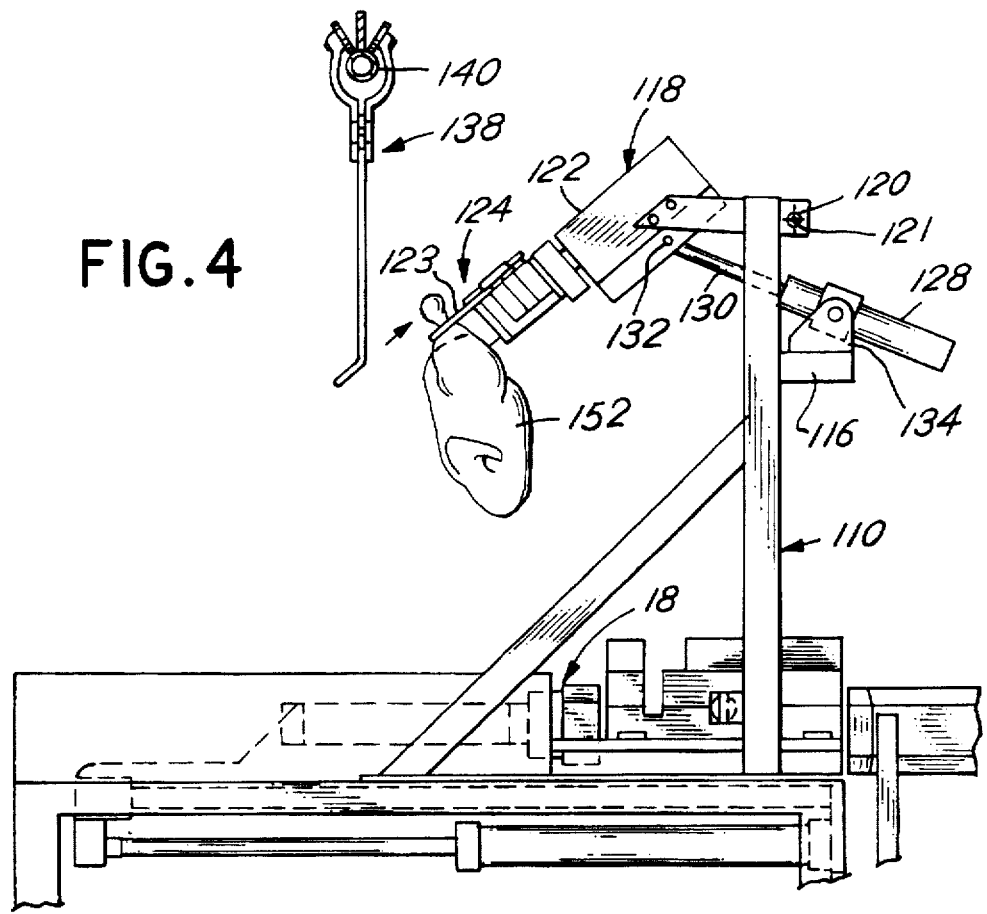
FIG. 4 is a side elevation illustrating the next sequential step in the operation of the transport arm.

The arm 118 includes a platform 122 which is horizontal when the pivot arm 118 is in the position illustrated in FIG. 2. Projecting downwardly and outwardly from the arm 118 and, more particularly from the platform 122, is a gripping arm assembly 124 including an extendable gripping arm 123 described in greater detail below. The gripping arm assembly 124 telescopes between a retracted position depicted in FIG. 2 and an extended position illustrated in FIG. 3. The limit of extension of the assembly 124 between the retracted and extended position is preferably uniform regardless of the orientation of the arm 118 about the shaft 120.

The support stand 110 also includes a receiving bay or first work station 12 which is adapted to receive product, such as processed meat or any other product for packaging. The particular work station or bay 12 is not a limiting feature of the invention. The transport arm 118 pivots about the shaft 120 in response to operation of a cylinder 128 having a rod 130 attached to a pivot connection 132 on the arm 118. The cylinder 128 is attached to the support members 112 and 114 so as to permit pivoting of the cylinder about a pivot axis 133. Thus, the cylinder 128 is supported by a bracket 134 attached to the vertical support members 112 and 114.

The rod 130, when extended as depicted in FIG. 2, maintains transport arm 118 in the configuration indicated, that is in a first position aligned for movement of the gripping members (gripping arm assembly 124) to engage product on the conveyor. The cylinder 128 is operable to cause the rod 130 to withdraw and thereby rotate the transport arm 118 in the counterclockwise direction as illustrated in the figures so as to align the gripping arm assembly 124 vertically with the vertical support members 112 and 114. In operation, the angle of pivot or the amount of pivot of the transport arm 118 effected by operation of cylinder 128 is in the range of approximately 45°+45°−15° depending upon the particular construction of the transport arm assembly and the product holder which retains or holds the product as will be described in greater detail below.

The conveyor with which the transport arm of the present invention is utilized is a typical conveyor that continuously operates to move product holders such as a shackle or carrier 138 along a conveyor support bar 140. Shackle or product carrier 138 includes first and second upright or vertical bars 142 and 144 connected together at their bottom end by a single open sided loop 146. The loop 146 forms an angle with the bars 142 and 144, for example, as depicted in FIG. 1. The angle 148 is preferably an obtuse angle so that a product such as element 150 of a product 152 will slide rearwardly and downwardly into the loop 146 when product 152 is carried by the conveyor bar 140. The spacing of the bars 142 and 144 in combination with the shape of the loop 146 retains product 152. The loop 146 thus defines a plane 154 which forms an acute angle with respect to horizontal and an obtuse angle with respect to the bars 142 and 144. Note that the gripping arm assembly 124 defines a similar angle with respect to horizontal, and thus assembly 124 is generally parallel to the plane 154 defined by the loop 146 when the transport arm 118 is in the first position as illustrated by FIG. 2. Further, the transport arm 118 and, more particularly, the gripping arm assembly 124 is positioned so as to be slightly below the plane 154 in FIG. 2. Thus, when the arm assembly 124 is extended as discussed below, a gripping arm 123 will grip the element 150 of the product 152 just beneath the holder 138.

FIGS. 8 and 9 illustrate in greater detail the gripping arm 123 of the gripping assembly 124. Specifically, the gripping arm 123 is comprised of a fixed central gripping plate 156 which is mounted on telescoping rods 158 associated with a cylinder 159 mounted on the pivoting arm 118. The rods 158 extend and retract so as to extend and retract the plate 156. The plate 156 thus comprises a stationary or fixed arm for engaging product 152. Mounted on the plate 156 is a movable or pivotal arm 162. The movable arm 162 pivots about axis 166 and is driven by cylinder 170 mounted on plate 156. The arm 162 moves toward and away from the arm 156 between a gripping position and a release position with respect to the element 150. Thus, the plate 156, or more particularly, the gripping assembly 124, including the plate 156 and arm 162 move or extend or telescope on the rods 158 due to actuation of cylinder 159 so as to intersect the element 150. The movable arm 162 is then closed by actuation of the cylinder 170 to firmly grip product 152, and more particularly, the element 150. The product 152 may then be removed from the shackle 138 by withdrawing the element 150 therefrom through the open side of the loop 146 which is in opposed relationship to the gripping assembly 124. Thus, the gripping member 123, and more particularly, the arm 162 engages the element 150 when in the extended position. When in the retracted position, the product 152 is removed from the shackle 138 and hangs vertically from gripping assembly or member 124.

Figure 7:
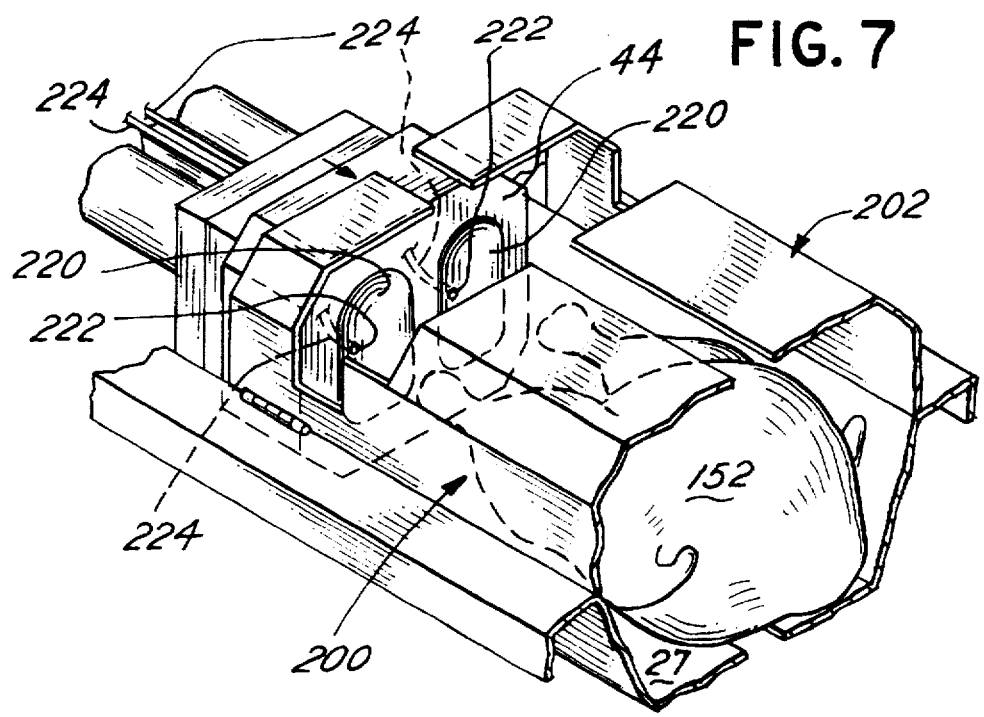
FIG. 7 is an isometric view illustrating the movement of the transport arm to position a product at the first work station wherein an optional vacuum pusher block may be utilized to evacuate gas from a flexible bag and wherein an optional clamping mechanism may be utilized to retain the product in alignment at the first work station.
Figure 10:
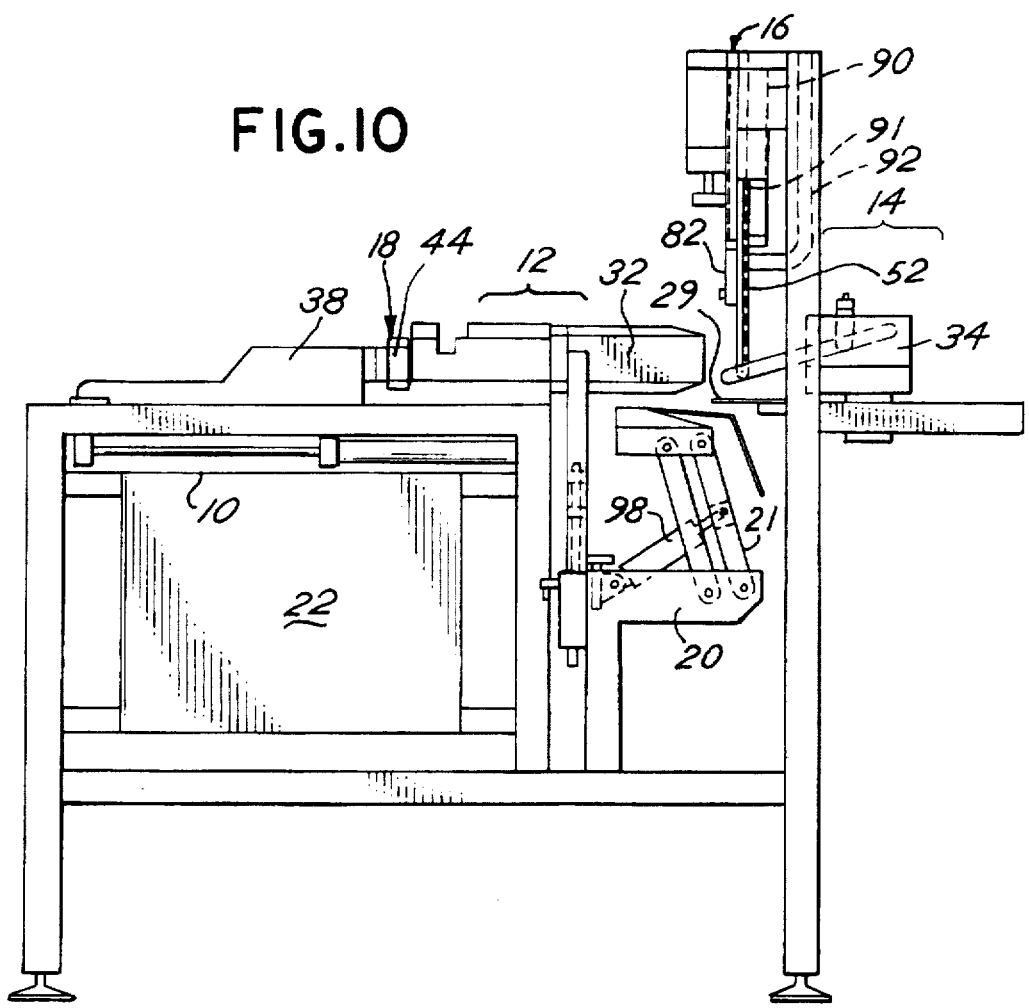
FIG. 10 is a side elevation of the bagging apparatus portion of the invention.
Figure 11:
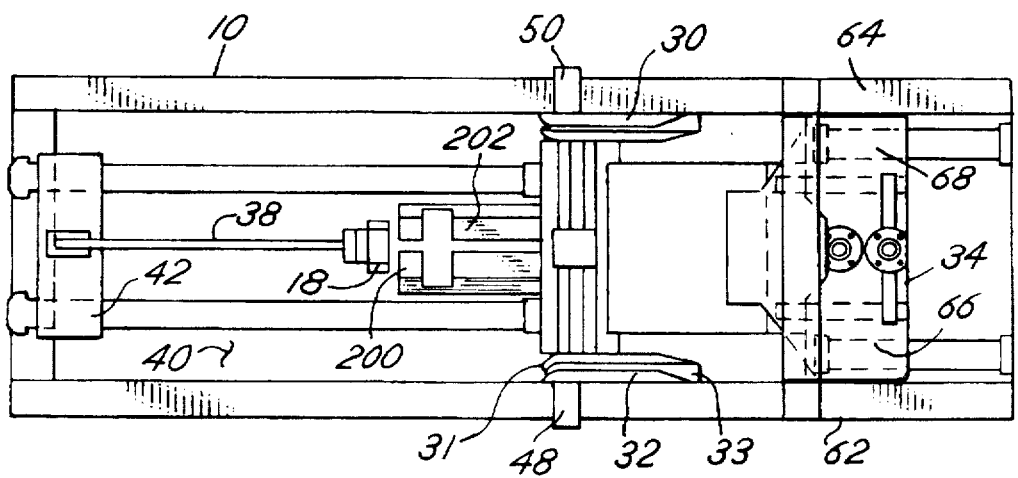
FIG. 11 is a top elevation view of the apparatus of FIG. 11.
Figure 12:
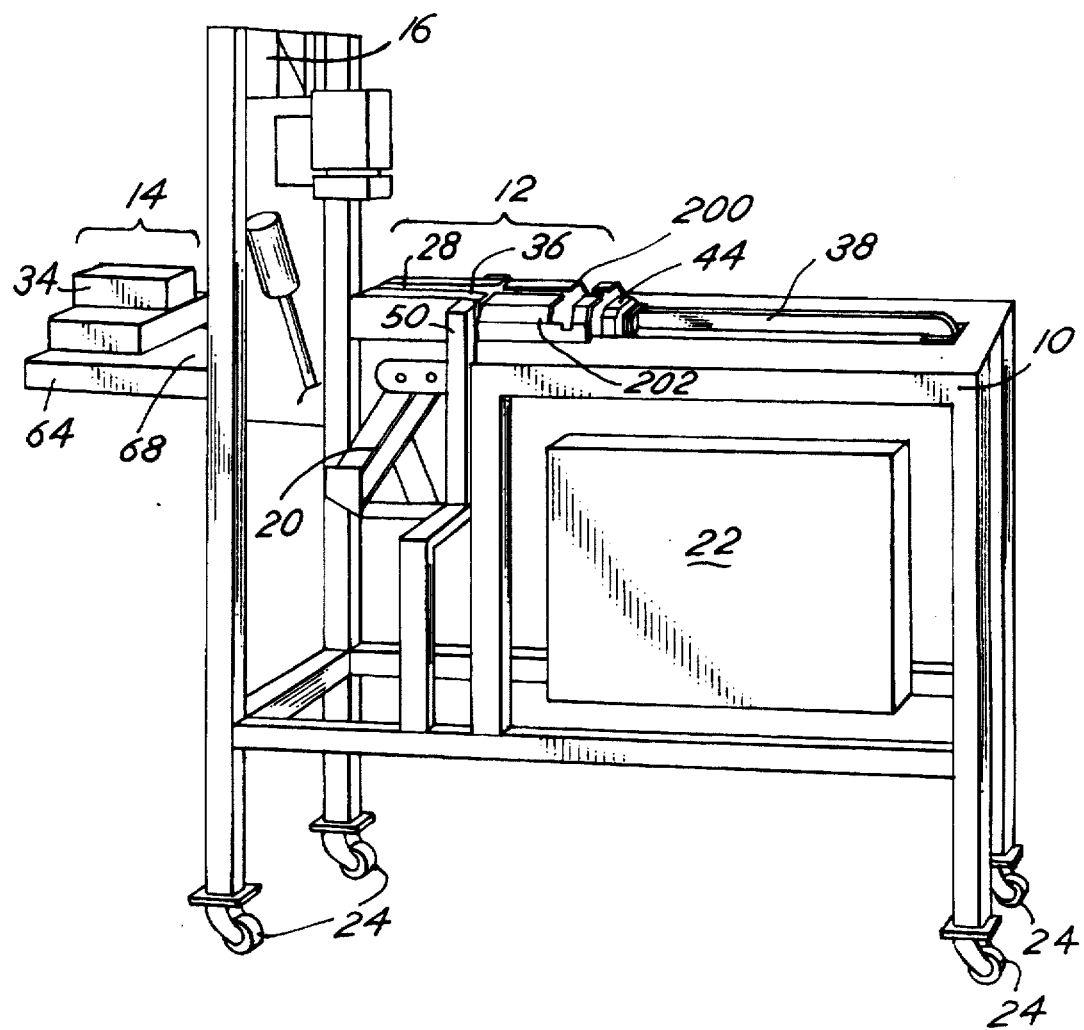
FIG. 12 is an isometric view of the apparatus of FIG. 11.
Figure 13:
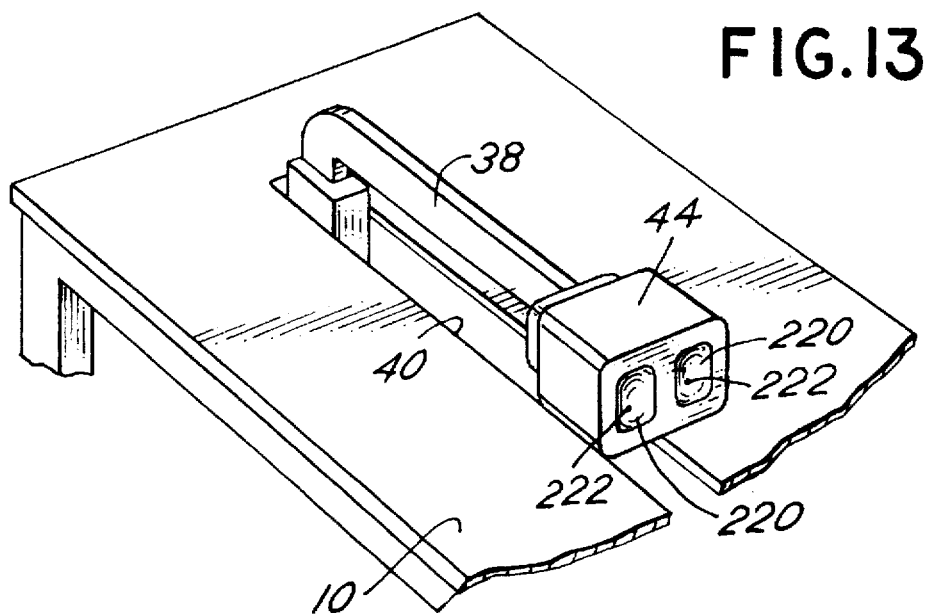
FIG. 13 is an enlarged, isometric view of a pusher construction for the apparatus of FIG. 10.
Figure 14:
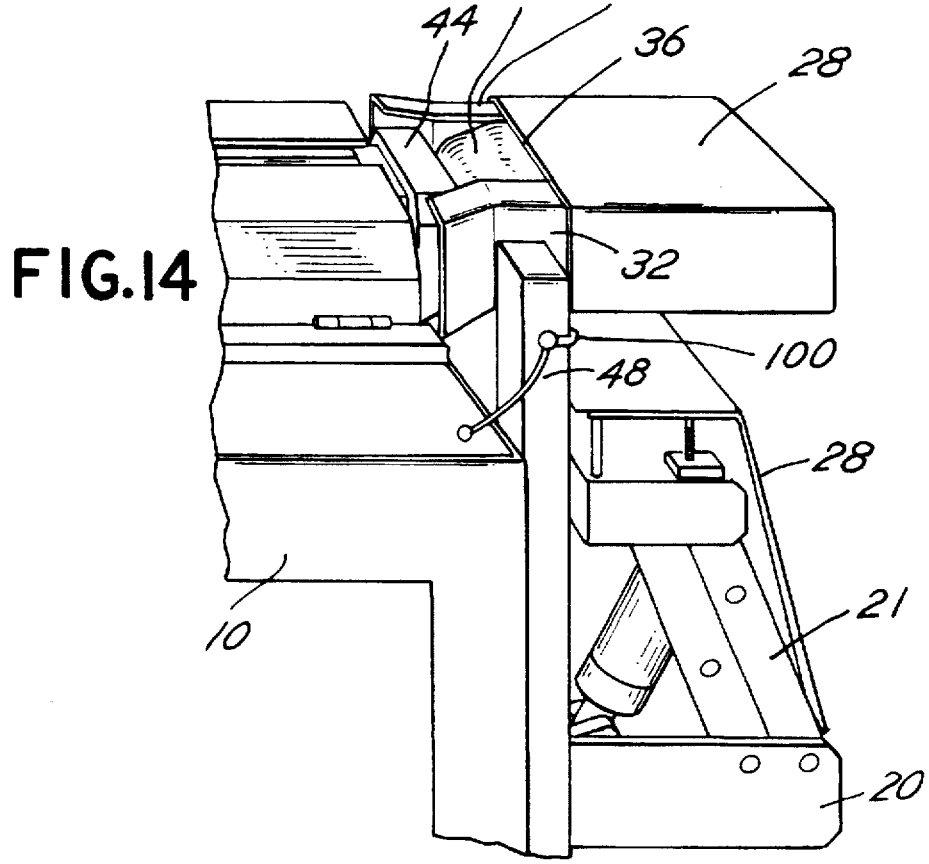
FIG. 14 is an isometric view depicting movement of product into a flexible bag at the first work station.
Figure 15:
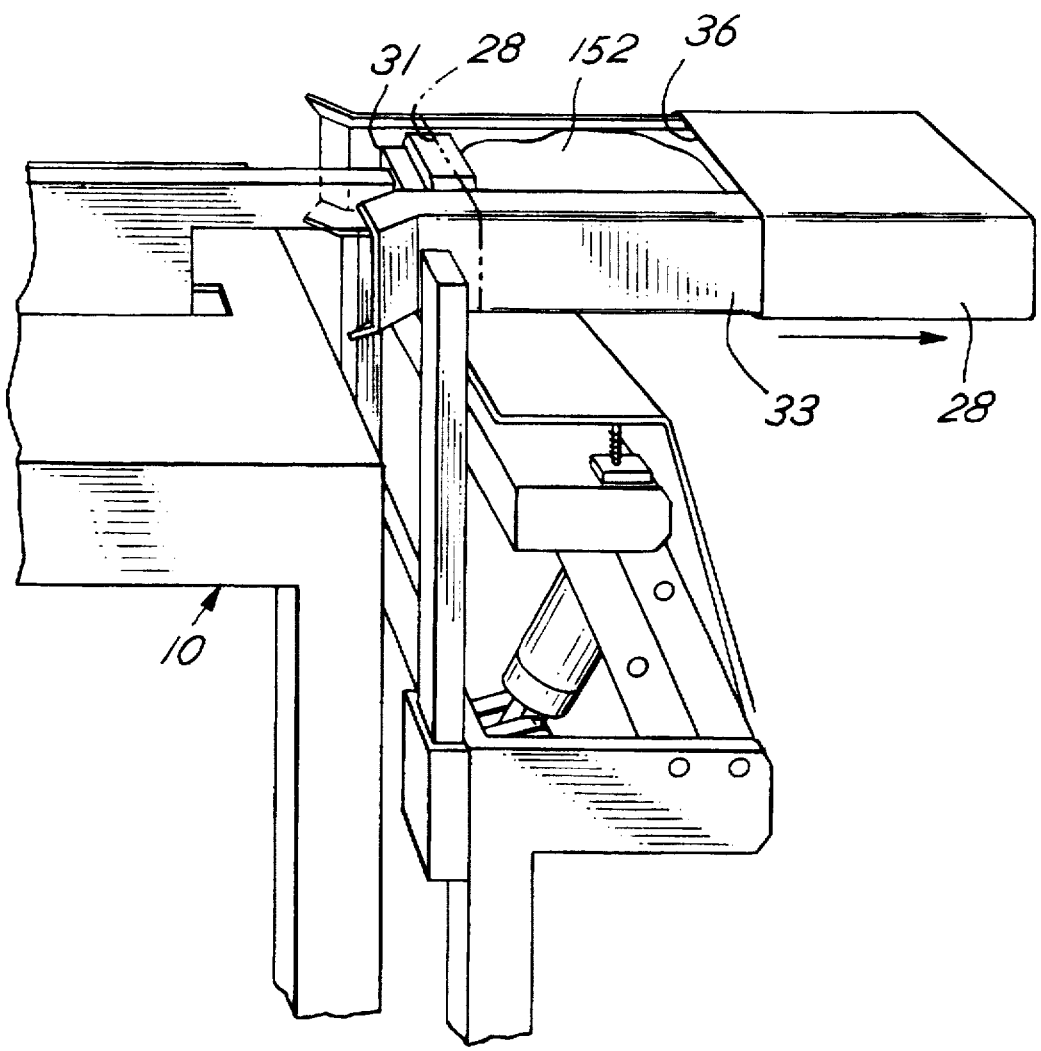
FIG. 15 depicts the movement of the product from the first work station toward the second work station.
Figure 16:
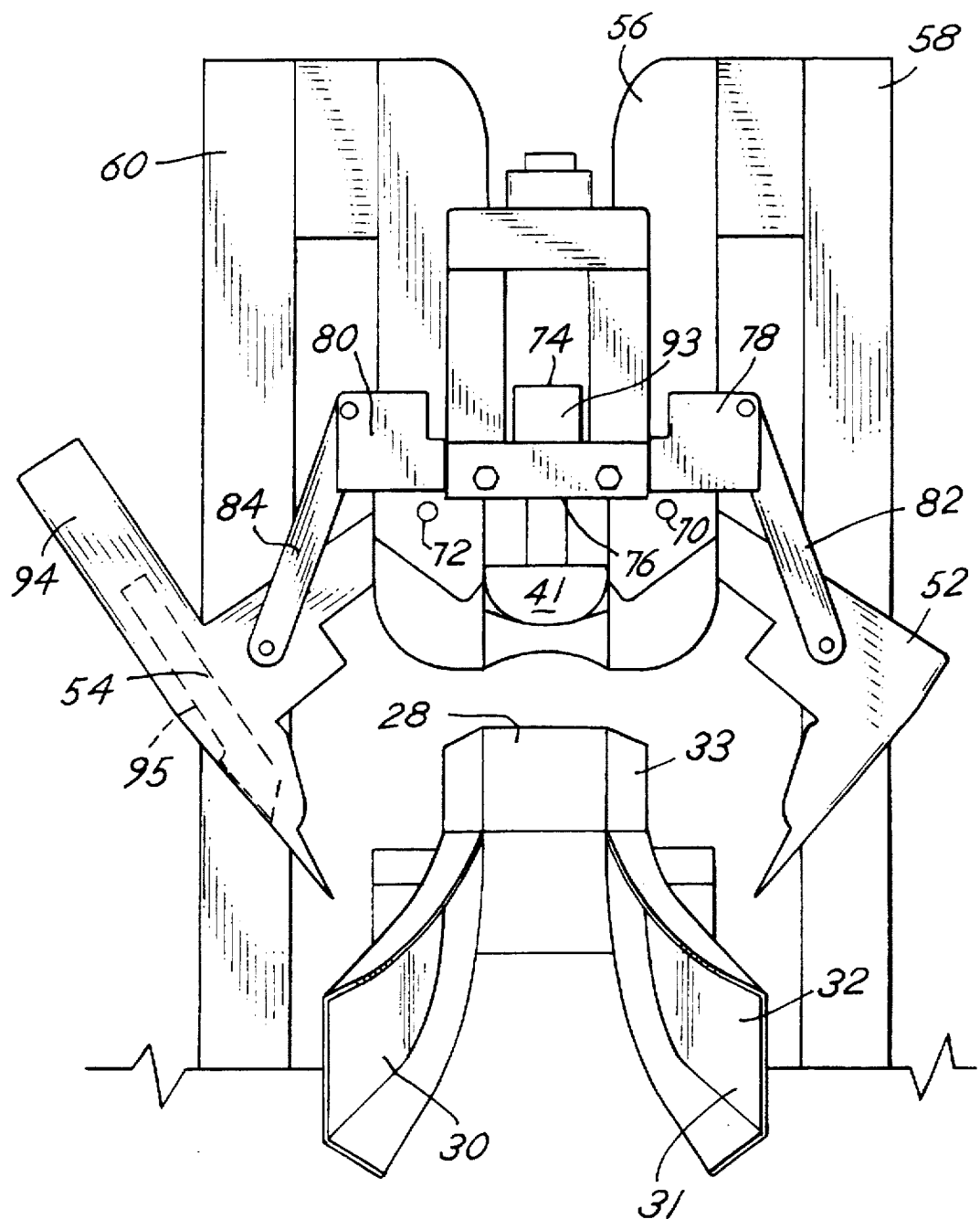
FIG. 16 is a sectional view of the operation at the clipping apparatus.
Figure 17:
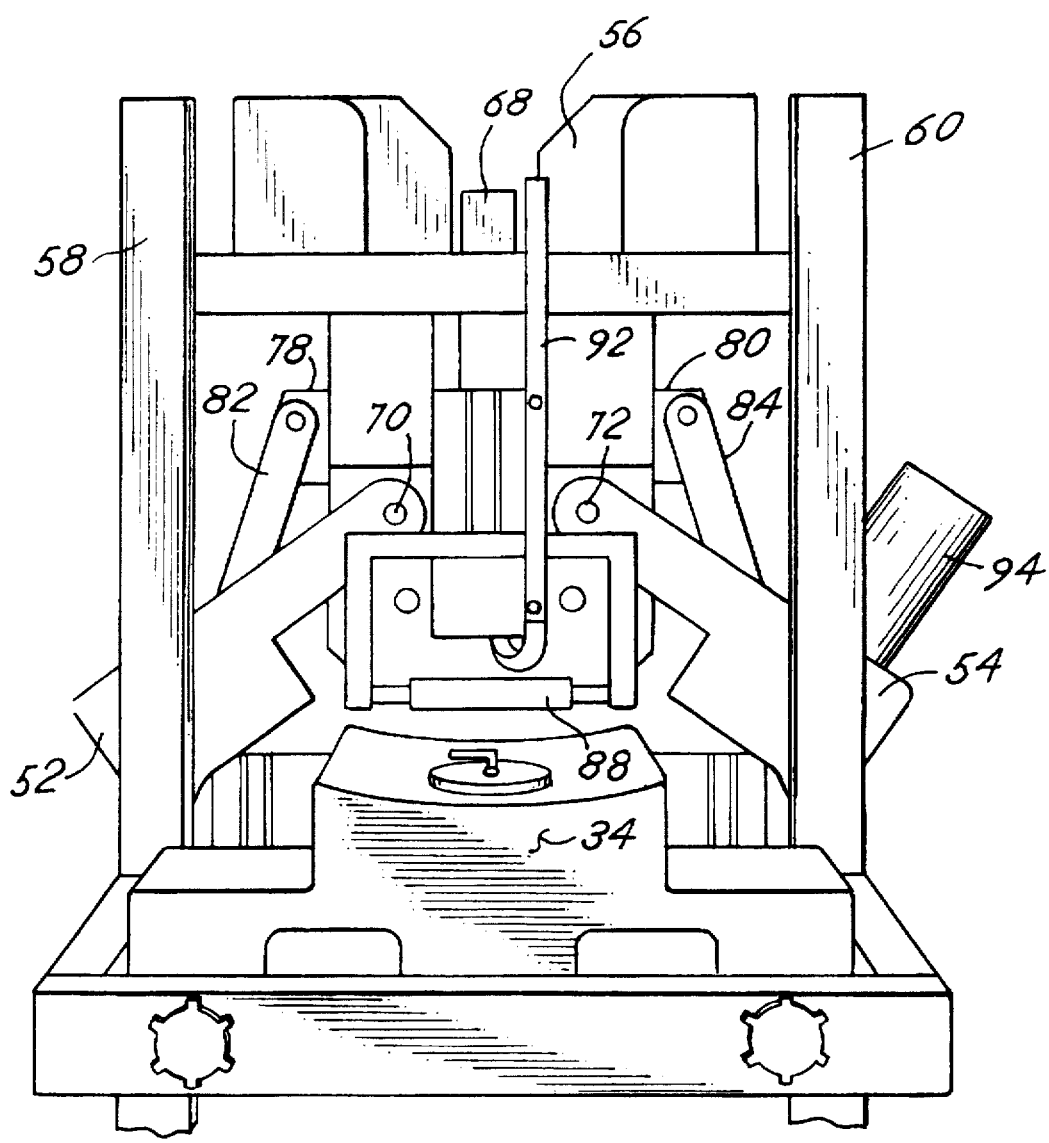
FIG. 17 is a sectional view of the clipping apparatus viewed from the second work station with the gate mechanism in a fully open position.
Figure 18:
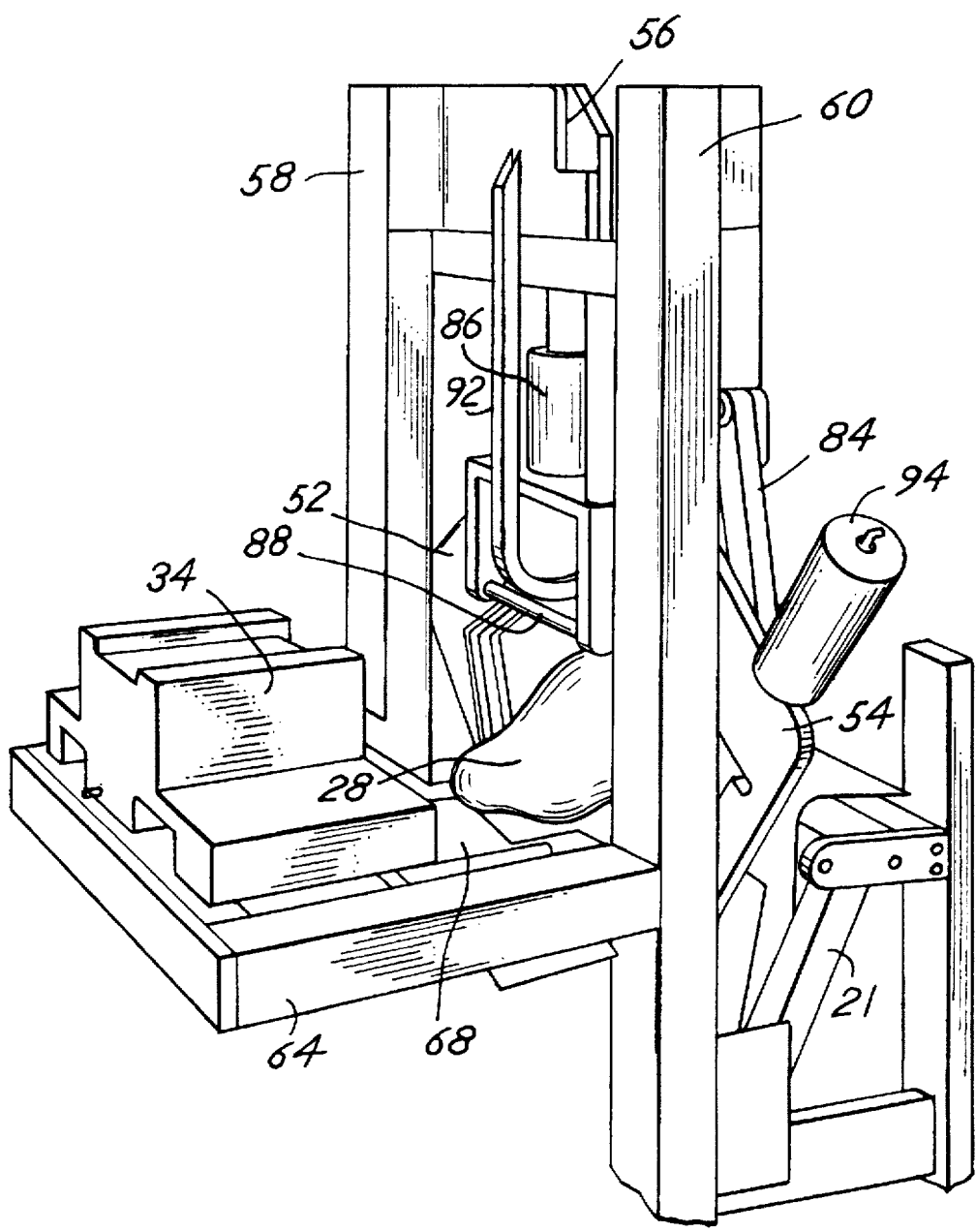
FIG. 18 is an isometric view of the clipper apparatus.
Figure 19:
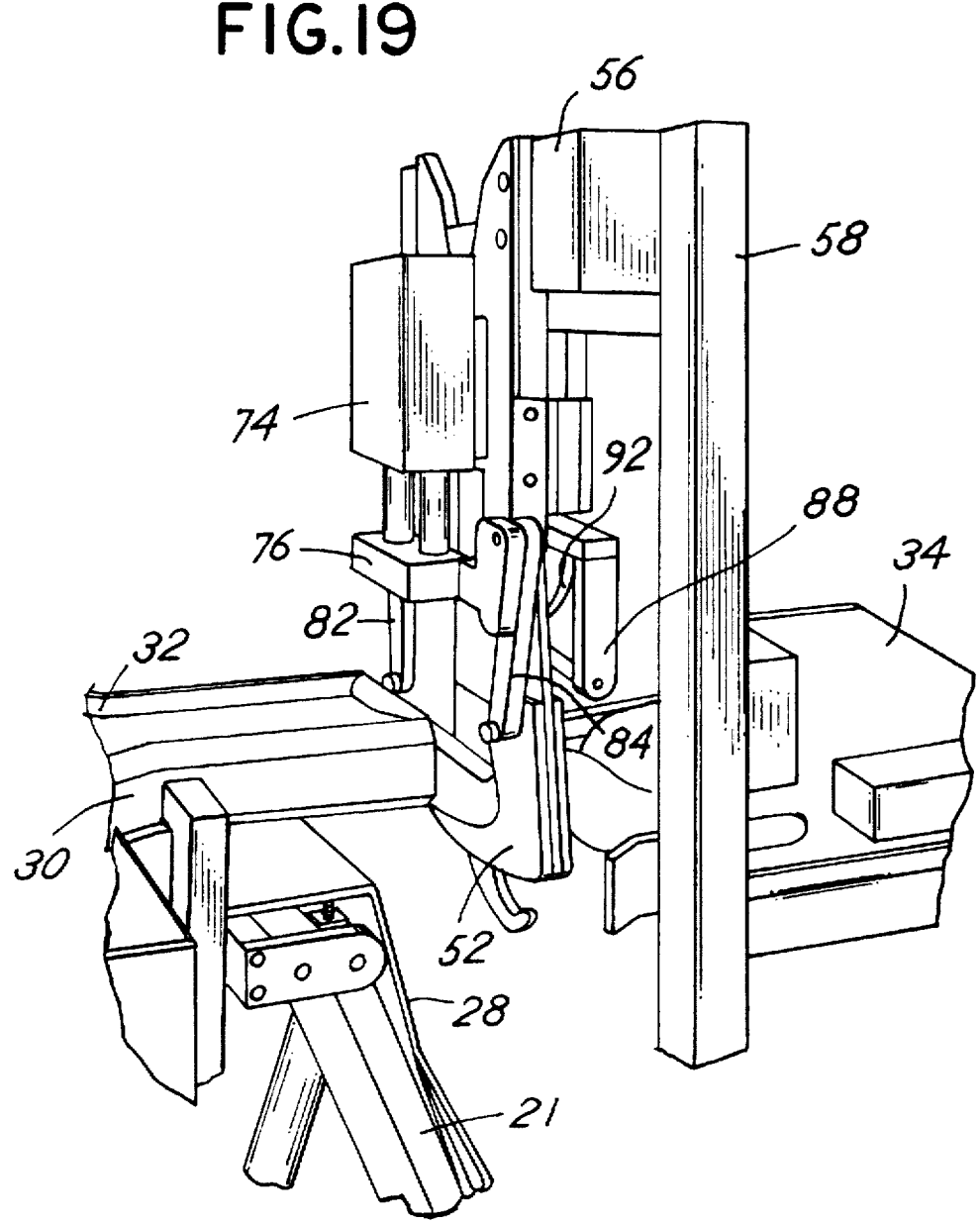
FIG. 19 is an isometric view of the clipping apparatus in the partially closed position.
Figure 20:
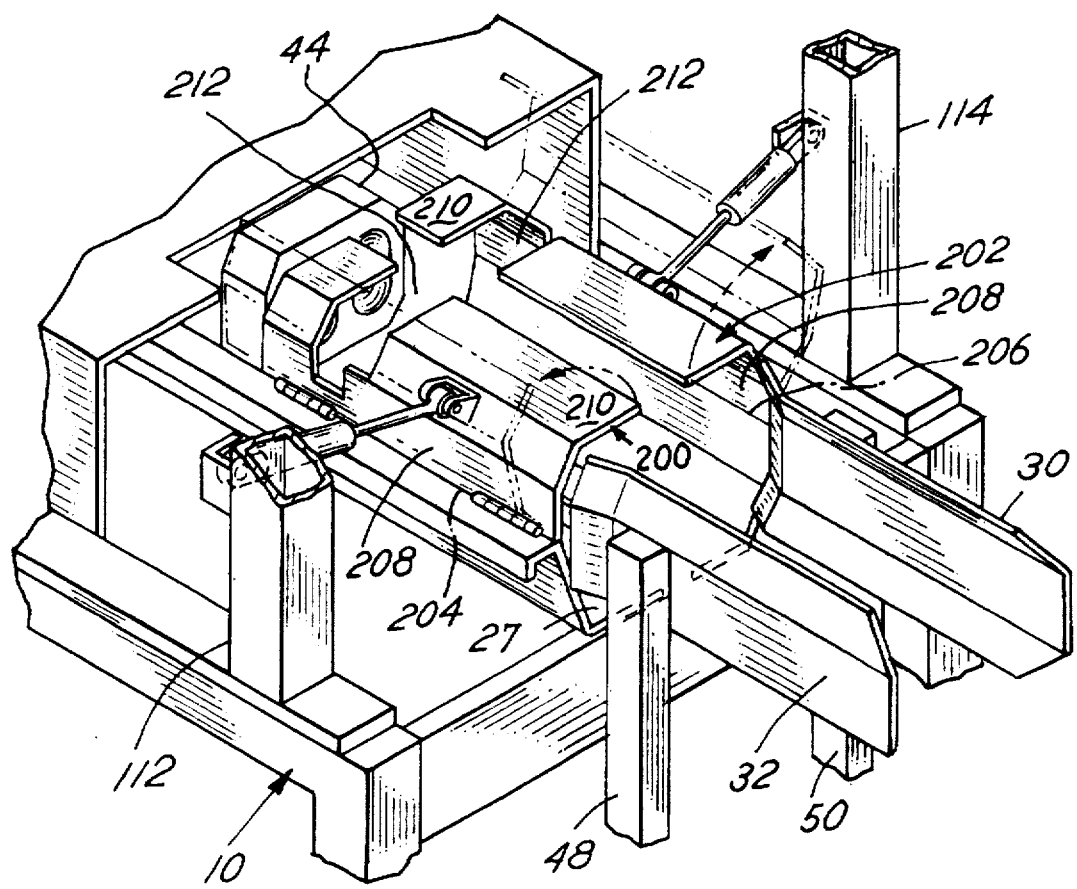
FIG. 20 is an isometric view illustrating the clamping plates associated with the first station of the packaging apparatus of the invention.

FIGS. 2–7 illustrate the sequence of operation between the position of the product 152 depicted in FIG. 2 and a horizontal position of product 152 at the work station or work bay 12 in FIG. 7. Thus, referring to FIG. 2, the side elevation of the various elements comprising the transport arm 118 are such that the gripping assembly or member 124 is in the retracted position and the transport arm 118 is in its horizontal position with the rod 130 extended. Subsequently, the gripping assembly 124, and more particularly, the plate 156 and 162 are telescopically extended due to operation of the rods 158 so as to engage a moving product 152, and more particularly, element 150 of the moving product 152 retained by a shackle 138 on a conveyor support bar or belt 140. The timing of the engagement is such that the jaws (shackle 56, arm 160) must extend at a fast rate to engage, grip and remove the product 152 from the moving conveyor carrier 138. The product 152 is thus, in essence, plucked from the conveyor quickly relative to the speed of movement of the carrier 138 on the conveyor.

As mentioned previously, the plates or jaws 156, 162 engage the element 150 below the plane 154 of the loop 146. The jaws 156, 162 are initially in the open position but move to the closed position as illustrated in FIG. 9 so as to grip the element 150. Subsequently, the rods 158 are retracted so that the product 152 is in the position illustrated in FIG. 4 where the product 152 is vertically suspended by the transport arm 118 ready for movement of that arm 118 to the next sequential station or step.

Figure 5:
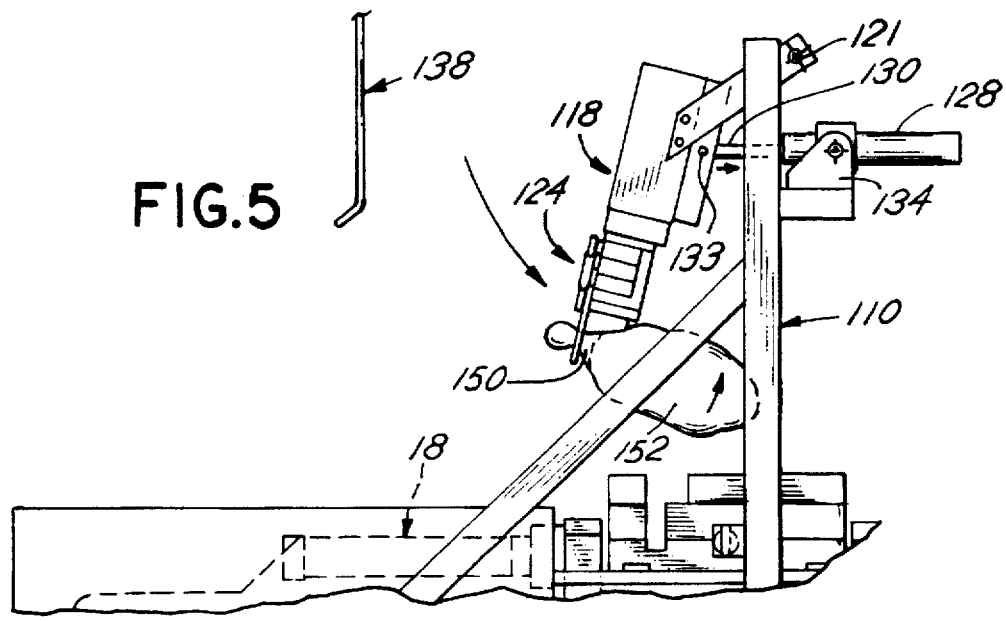
FIG. 5 is a side elevation illustrating the next sequential step in the operation of the transport arm.
Figure 6:
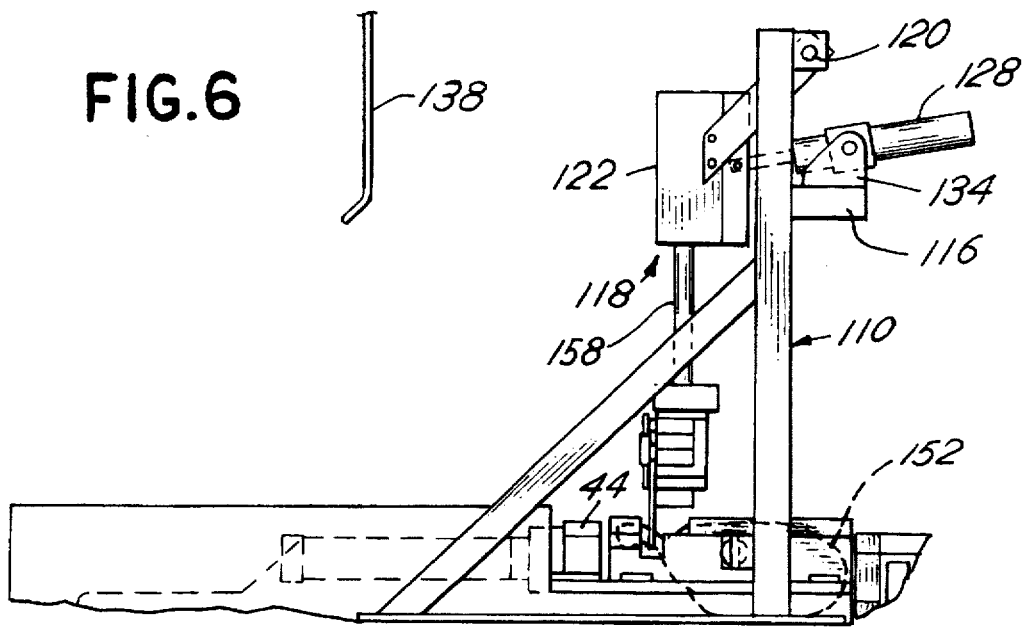
FIG. 6 is a side elevation illustrating a further sequential step of the transport arm.

FIG. 5 illustrates the movement of the pivoting transport arm 118. The transport arm 118 moves in a counterclockwise direction (relative to FIG. 2) and moves sufficiently quickly so that the product 152 swings about the element 150 when the jaws 156, 162 grip the product 152. The product 152 is then thrown forward into a generally horizontal position. The pivot arm 118 continues through its full rotational cycle to the position illustrated in FIG. 6 and the product 152 has been then placed in a fully horizontal position. Simultaneously the rods 158 are again extended so that the product 152 is positioned firmly into the horizontal position at the work bay or work station 12.

The first work station 12 includes first and second work station clamps 200 and 202 which are mounted on opposite sides of the bay 12 for pivotal movement of each respectively about a horizontal axis 204 and 206 respectively. The clamps 200 and 202 rotate in opposite directions toward one another. Each clamp includes an upstanding or vertical wall 208 in the closed position and an enclosing or horizontal wall 210, again in the closed position. A slot 212 is defined in each of the walls 208 and 210 extending across the horizontal wall from the free edge of the clamp 200 and partially down the vertical wall 208. The slot 212 is dimensioned so that when the gripping arm 123 positions a product 152 into the bay of the work station 12, the clamp 200 and 202 may be pivoted about their respective axis 204 and 206 with the slot 212 fitting around the arm 123. The arm 123, and more particularly the jaws 156, 162 may then be released and the arm 123 retracted. In operation, the sequence of events, typical with respect to the mechanism is that the clamps 200 and 202 will encircle, orient and retain the product 152 at the station or bay 12. The gripping arm 123 will then be released. Thereafter, a pusher will transport the product as previously described. The clamps 200 and 202 may be incorporated with or separate from plates 30 and 32 described below.

The arms or jaws 156, 162 then are released from the product 152. The product 152 is then available for further processing beginning at the bay or work station 12. Subsequent to release of the jaws 156, 162, the rods 158 retract the assembly or member 124 into the transport arm 118. The arm 118 may then be retracted to its original position illustrated in FIG. 2.

The transport arm 118 has associated therewith various sensors which sense the presence of products such as product 152 and carriers such as carrier 138. Thus a first sensor 214 is provided to detect the presence and movement of a carrier 138 past the gripping assembly 124 associated with the transport arm 118. The first sensor 214 can be set to count an integral number of carriers 138, for example, four (4) carriers 138, before providing a positive signal to initiate operation of the transport arm 118 and the mechanism for gripping associated therewith. A second sensor 216 is also provided to sense product 152 on a carrier 138. Thus, even though the first sensor may provide an actuation signal with respect to the operation of the transport arm 118, a second signal from the second sensor 216 sensing that a product is in position to be gripped and carried, will typically be required. Thus the sensors 216 and 214 act as an AND gate for operation of the transport arm 118 and associated components.

Packaging Apparatus

Referring to the remaining figures, the packaging apparatus section of the present invention is supported on a moveable frame 10 and includes the first product placement work station 12 and a second bag closing work station 14 with a clipping apparatus 16 positioned between the stations 12 and 14. A pusher mechanism 18 is provided to transport product 152 from the first station 12 to the second station 14. A bag dispenser 20 is positioned beneath and adjacent to the first station 12 intermediate the first station 12 and the clipping apparatus 16. A control panel 22 is mounted on the frame 10, and the frame 10 is mounted on wheels 24 so that the apparatus is generally totally self contained and mobile.

In operation, the product 152 is positioned at the first station 12 on a horizontal support surface 27. A flexible bag 28 is retained on spaced plates 30 and 32 with the open end of the bag 28 facing the product 152 positioned on surface 27 to thereby receive the product 152 in response to movement of the pusher mechanism 18. Operation of the pusher mechanism 18 causes the product 152 to move into the bag 28. The combined product 152 and bag 28 are further moved to the second station 14 in between the gathering arms or gates 52, 54 of the clipping apparatus 16. Movement to the second work station 14 is slightly retarded by the reciprocally sliding block 34 which is controlled by an adjustable air flow control brake mechanism and is thereby positioned to engage against the product 152 and bag 28. Consequently, the product 152 is tightly maintained within the bag 28 as the combination of product 152 and bag 28 are moved to the second work station 14.

The second work station 14 also includes a horizontal support platform 29 which is substantially at the same level as the support platform 27 associated with the first station 12. The support platform or surface 29 associated with the second station 14 may, however, be at a slightly lower elevation inasmuch as the product 152 and bag 28 will tend to fall slightly due to gravity during transport by operation of the pusher 18.

Once the bag 28 with the product 152 therein is appropriately positioned at the second station 14, the open end 36 of the bag 28 will project toward the first station and into the region of the clipping apparatus 16. The clipping apparatus 16 will then operate to close and seal the open end of the bag 28 and thereafter cut off the excess amount or tail of the bag 28. Subsequently, block 34 fully retracts from the second work station 14 and the trap doors defining the horizontal support surface 29 of the second work station 14 will open to release the bagged product 152 in the bag 28 vertically downward onto a conveyor. Thereafter, the clipping apparatus 16 will open gates 52, 54 and the bag dispenser 20 will move upwardly and in a manner which permits an air jet to open the open end 36 of a bag 28. The open end 36 is then fitted over the plates 30 and 32 for receipt of further product 152.

Pusher Construction

The pusher 18 comprises an arm 38 which fits through a slot 39 in table 40 or may be driven by a rod projecting from a cylinder at the end of bay or station 12. The arm 38 coacts with and is driven by a pneumatic cylinder for a reciprocal movement toward and away from the second work station 14. The arm 38 is directly connected to a block 44. Block 44 includes indentations for engaging the product 152, and forming the product in a manner desired for purposes of packaging.

In operation, product 152 is positioned in front of the block 44 in the product pathway between the plates 30 and 32. The forward movement of the arm 38 engages the block 44 with product 152, to transport product 152 into bag 28, and to thence transport the bagged product linearly along the direction of the pathway from the first work station 12 to the second work station 14.

The block 44 includes a vacuum system associated therewith whereby the product 152, during insertion into a bag 28, will be subjected to a vacuum so as to tightly compress the bag 28 about the product 152 and facilitate the application of a fastener or clip about the gathered neck of the bag by means of the clipper mechanism. Thus the block 44 includes a recess 220 with a vacuum inlet 222 at the base of the recess. The vacuum inlet 222 connects through the block 44 to a vacuum line 224. Vacuum line 224 attaches to a vacuum manifold (not shown). When the block 44 is extended by operation of the associated piston and cylinder, which is used to drive the block 44, the vacuum line 224, which is flexible and extendable, will be in position to provide a vacuum once the block 44 pushes product 152 into a bag 28. Thus, as the block 44 pushes product 152 between plates 30 and 32, and then causes the product 152 to enter bag 28, the vacuum control initiates withdrawal of air from the bag 28. As the block 44 continues to push the product 152 and bag 28 to the second station, the bag 28 is evacuated. The bag 28 tightly binds about the product 152 to facilitate the gathering of the neck of the bag 28 for attachment of a fastener thereto. The recess 220 may be of any desired shape and configuration so as to cooperate with the product and effect appropriate guidance, centering and location of the product 152 during the transfer operation from the first station to the second station.

First Work Station

The plates 30 and 32 are arranged in generally parallel, spaced array on opposite sides of the first work station 12 and, more particularly, on opposite sides of the horizontal support surface 27 defined at the first work station 12. The plates 30 and 32 thus define a pathway and are mounted respectively on plate support arms 48 and 50 which operate to move the plates 30, 32 to thereby vary the spacing of the plates 30, 32 one from the other by moving them toward and away from one another during the cycling operation of the apparatus. The plates 30 and 32 have an entry end 31 and the plates 30, 32 converge toward an exit end 33. The plates 30, 32 at the exit end 33 are generally parallel. The plates 30 and 32 at exit end 33 are designed to fit into the open end 36 of bag 28. The plates 30 and 32, thus, are spaced from one another and tightly retain bag 28 thereon. The bag 28 is a flexible plastic bag which is retained on a bag support rack 21 associated with the bag dispenser 20 by means of a wicket wire in a manner known to those skill in the art.

After the product 152 is transported into the bag 28 by operation of the pusher 18, the bag 28 slides off the exit end 33 of the plates 30 and 32. The plates 30 and 32, then, move outwardly relative to one another so that the pusher block 44 may move along the pathway between the plates 30,32 and thereby continue with the transport of the product 152 and bag 28 toward the second work station 14. During this transfer movement, the product 152 and flexible bag 28 are pushed through the clipper apparatus 16 and, more particularly, through the spaced gates 52 and 54 which are pivotally attached to a support plate 56 of the clipping apparatus 16. Support plate 56, thus, is supported by attachment to vertically descending and ascending frame members 58 and 60.

Second Work or Product Station

The product or second work station 14 is supported by horizontal frame members 62 and 64 which extend from the vertical frame members 58 and 60. The second work station 14 includes horizontal support members 66 and 68 which are pivotally attached to the horizontal frame members 62 and 64 respectively. Normally, the horizontal support members 66 and 68 are maintained in a horizontal position for support of the product 152 and enclosing bag 28. The support members 66 and 68 pivot about horizontal axes and thus serve as a "trap door" for support of the product 152 in the flexible bag 28. The trap door opens whenever the product 152 is finally packaged in a sealed bag 28.

A reciprocal block 34 is slidably supported on the horizontal frame members 62 and 64 in the pathway of the product 152. The block 34 moves between a retracted position, which exposes the totality of the second work station 14, to a forward position, where it engages the product 152 and flexible bag 28 as those elements are transported to the second work station 14 and through the clipping apparatus 16. Thus the block 34 insures that the flexible bag 28 and product 152 remain tightly packed as they are transported between work stations 12 and 14.

Clipping Apparatus

The clipping station or clipping apparatus 16 is positioned intermediate the first work station 12 and the second work station 14 downstream from the bagger. This permits the product 152 to be transported in a linear direction from the first work station 12 to the second work station 14 through the clipping apparatus 16. The clipping apparatus 16 is generally mounted on a support plate 56 which is suspended between the vertical frame members 58 and 60. The support plate 56 has attached thereto first and second pivotal gates 52 and 54. The gates 52 and 54 swing about pivot axes 70 and 72 between a fully opened position and a fully closed position.

When gates 52, 54 are in the fully open position, it is possible for product 152 to fit therebetween and be moved from the first work station 12 to the second work station 14. The gates 52 and 54 are driven between the open and closed position by a pneumatic cylinder 74 which operates to drive a reciprocal bracket 76 vertically upwardly and downwardly. The bracket 76 includes outwardly projecting arms 78 and 80 which are attached respectively to links 82 and 84 that pivotally connect to the gates 52 and 54. As the bracket 76 is driven downwardly by operation of the cylinder 74, the gates 52 and 54 are driven by links 82, 84 and pivot about respective axes 70 and 72 toward one another thereby gathering bagging material therebetween and also forming a clip channel through which a U-Shaped metal clip may be driven against an anvil positioned in the bottom of one of the gates 54.

Prior to operation of the gate cylinder 74, however, a holding bar cylinder 86 also mounted on plate 56 drives a holding bar 88 vertically downward. The holding bar 88 is positioned to engage and retain the product 152 tightly within the bag and against the block 34. The holding bar also, preliminarily, causes the flexible packaging material of the flexible bag 28 to be partially folded so that when the gates 52 and 54 close, they will properly form the flexible bag material for attachment of a U-Shaped metal clip. Thus, the holding bar cylinder 86 initially operates to cause the holding bar 88 to descend. Thereafter, the gate cylinder 74 operates sequentially to cause gates 52 and 54 to close.

Subsequently, a third cylinder 90 mounted on support plate 56 operates to drive a punch 91 in the clip channel formed by gate members 52, 54. The punch engages a clip fed from a clip rail 92 also mounted on plate 56. The clip is driven through the clip channel and formed about the gathered plastic material at the open end 36 of the flexible bag 28. This closes the bag 28 and the product 152 therein. A cylinder 93 then operates to engage a block 41 forward of the gates 52, 54 and the clipper to engage the film open end 36 to hold it so that the knife 95 may efficiently cut the film open end 36. Subsequent thereto, a fourth cylinder 94 mounted on one of the gates 52 is actuated to operate a knife 95 which clips off excess bag material at the outside or open end 36 of the flexible bag 28. Then the gates 52 and 54 are opened and the holding bar 88 raises. The trap doors 66, 68 are next opened to release the product 152 onto a conveyor (not shown).

Bag Dispenser

At the end of each cycle it is necessary to position a single bag 28 on the exit end 33 of plates 30 and 32. This is accomplished by operation of the bag dispenser 20. The bag dispenser 20 includes a bag support rack 21 which receives and retains a series of plastic bags 28. The open ends 36 of the bags 28 are formed so that a portion of each bag 28, at the open end 36, has a greater length. A wicket wire fits through openings in this bag extension or extra length. The wicket wire thus fits through the openings in the bag extension and into the support rack 21.

During transfer of product 152 from the first work station 12 to the second work station 14, the support rack 21 is in the recessed or retracted position. At the end of a packaging cycle, however, a cylinder 98 extends the support rack 21 upwardly and outwardly toward the second work station 14. A blast of pressurized air from a nozzle 100 supported on the frame 10 is directed into the top bag 28 on the support rack 21. This causes the bag 28 to flair open. The plates 30 and 32 are then controlled to move toward one another by the plate support arms 48 and 50 so that the plates 30 and 32 will fit into the open end 36 of the bag 28. The support rack 21 with the open bag is then transferred laterally toward the first work station 12. The support plates 30 and 32 then expand or separate from one another and tightly engage the sides of the bag 28. The support rack 21 then descends tearing the extension of the bag 28 from the wicket wire which attaches the bag to the support rack 21. A bag 28 is then in position for receipt of product 152 and the device may be cycled through its stages of operation as described.

In the foregoing description, reference is made to the packing of product. The packaging apparatus of the invention may be utilized with respect to many materials and products. Important features of the invention include the mechanism for transferring the product from the first work station 12 to the second work station 14 through or under the clipping mechanism 16. In this regard, the clipping mechanism 16 is constructed so that there is sufficient and adequate room to transfer the product 152, including the bag for the product, from the first work station 12 to the second work station 14 without interfering with the clipping apparatus 16. Also, the mechanism for positioning the bag on the separated plates 30 and 32 may be altered or varied. Various other aspects of the invention may be modified without changing the spirit and scope of the invention. The invention is therefore to be limited only by the following claims and their equivalents.

What is claimed is:

1. Apparatus for removing a unit of product from a continuously moving conveyor having product carriers aligned in serial order and moving on said conveyor, said apparatus further useful for packaging said product, said apparatus comprising in combination:

a frame;

a first product receiving station on the frame;

a second horizontally aligned product packaging station on the frame spaced forwardly from the first station and including a platform for support of a product;

a pivoting product transport arm also on the frame said arm including product gripping and movement means, said arm pivotal about a horizontal axis between a carrier disengagement position and a first station delivery position;

a transport arm drive mechanism connected between the transport arm and the frame for rotating the transport arm intermittently from the carrier disengagement position to the delivery position and vice versa;

a product gripping member mounted on the transport arm and telescopically movable between an extended position and a retracted position, said product gripping member including gripping means for engaging and releasably holding a product, said extended position of said gripping member being substantially equal when the transport arm is in the carrier disengagement and the delivery positions;

control means for intermittently and sequentially (a) maintaining the transport arm in the carrier disengagement position, (b) simultaneously extending the gripping member to the extended position to the conveyor for engaging a product, (c) retracting the gripping member to the retracted position with a product, (d) pivoting the transport arm to the delivery position to transport the product to the first station, (e) releasing the gripping means, (f) retracting the telescoping gripping member to the retracted position and (g) pivoting the pivot arm to the carrier disengage position;

guide plates on opposite sides of the first station support surface for guiding the product as it moves on the support surface from the first station forwardly;

a clipper mechanism positioned between the first and second stations for gathering packaging material and subsequently attaching a U-shaped metal clip about gathered material positioned intermediate the stations;

a bag holder adjacent the first station for holding a bag of the type having an open end in the pathway between the first and second stations, with the open end of the bag positioned to receive the product therein;

a pusher block at the first station for engaging, holding and directing the product toward the second station;

a pusher block drive mechanism for driving the pusher block forwardly for moving the product from the first station into the open end of the bag, for subsequently moving the bagged product continuously to the second station with the open end of the bag projecting into the open space between the stations for gathering and closure by the clipper mechanism, said block drive mechanism including a reciprocal drive for removing the pusher block from the space between the stations prior to attachment of a clip by the clipper mechanism; and said second station support platform including a mechanism for transporting the product from the platform.

2. The apparatus of claim 1 wherein the gripping member comprises a plate with a pivotal hooked arm mounted on the plate, said hooked arm pivotal toward the plate to grip a product and away from eh plate to release a product.

3. The apparatus of claim 1 wherein said pusher block includes a leg pushing block, said block including a central recess and a circumferential rib for retaining the product at least partially within the recess.

4. The apparatus of claim 1 wherein said pusher block includes at least one vacuum passageway connected to the face of the block which engages the product.

5. The apparatus of claim 4 wherein said block further includes at least one vacuum passageway connected to the recess.

6. The apparatus of claim 1 wherein the first station includes at least one product clamping means comprising a pivoting plate movable between a first position at the first station to retain a product at said station and a second position for not retaining a product.

7. The apparatus of claim 6 wherein the clamping means comprise a plate which constrains a product in the first station from removal when said plate is pivoted to the first position.

8. The apparatus of claim 7 wherein the clamping means comprise a plate which constrains a product in the first station from removal when said plate is pivoted to the first position.

9. The apparatus of claim 6 wherein said clamping means comprises a plate having a side and a top, said side hinge along one edge of the first work station.

10. The apparatus of claim 9 including a slot in the plate for the product transport arm.

11. The apparatus of claim 1 including product sensor means for sensing product carried by the conveyor and means responsive to the means for sensing to actuate the transport arm.

12. The apparatus of claim 11 wherein the means for sensing includes means for counting product carriers on the conveyor transported in opposition to the transport arm and further including means for operating the transport arm following sensing a multiple number of said carriers.

13. The apparatus of claim 1 wherein the transport arm includes a product clamping mechanism for gripping and transporting product from the conveyor line, said clamping members having an open-release position and a closed-product clamping position.

14. The apparatus of claim 1 wherein the transport arm includes a product clamping mechanism and further the conveyor includes product carriers of the type having an open sided hook for carrying product, said clamping mechanism positioned to remove product from the open side of the hook.

* * * * *